US012689039B2

(12) United States Patent
Horikawa et al.

(10) Patent No.: US 12,689,039 B2
(45) Date of Patent: Jul. 21, 2026

(54) ELECTRICAL COLLECTOR BODY OF SECONDARY BATTERY AND SECONDARY BATTERY

(71) Applicant: PRIME PLANET ENERGY & SOLUTIONS, INC., Tokyo (JP)

(72) Inventors: Daisuke Horikawa, Kariya (JP); Yohei Shindo, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 913 days.

(21) Appl. No.: 17/721,615

(22) Filed: Apr. 15, 2022

(65) Prior Publication Data

US 2022/0344671 A1 Oct. 27, 2022

(30) Foreign Application Priority Data

Apr. 21, 2021 (JP) ................................. 2021-072121

(51) Int. Cl.
H01M 4/66 (2006.01)
H01M 4/72 (2006.01)

(52) U.S. Cl.
CPC ........... H01M 4/667 (2013.01); H01M 4/661 (2013.01); H01M 4/72 (2013.01)

(58) Field of Classification Search
CPC .............................. H01M 4/667; H01M 4/661
See application file for complete search history.

(56) References Cited

U.S. PATENT DOCUMENTS

| | | | |
|---|---|---|---|
| 2012/0052378 A1* | 3/2012 | Torata ..................... | H01M 4/78 |
| | | | 429/234 |
| 2014/0065491 A1* | 3/2014 | Yokouchi .......... | H01M 10/0525 |
| | | | 429/211 |
| 2020/0082998 A1 | 3/2020 | Sawada et al. | |
| 2020/0194779 A1 | 6/2020 | Kawaguchi | |

FOREIGN PATENT DOCUMENTS

| | | | |
|---|---|---|---|
| CN | 110637385 A | 12/2019 | |
| CN | 111033837 A | 4/2020 | |
| EP | 1 065 743 A2 | 1/2001 | |
| JP | H 05251082 A | 9/1993 | |
| JP | 11102711 A * | 4/1999 | ............. Y02E 60/10 |
| JP | 2000-192260 A | 7/2000 | |
| JP | 2007026913 A * | 2/2007 | |
| JP | 2008-311171 A | 12/2008 | |
| JP | 2009-205903 A | 9/2009 | |
| JP | 2010-153140 A | 7/2010 | |
| JP | 2012-048913 A | 3/2012 | |
| JP | 2012-129114 A | 7/2012 | |
| JP | 2019-071208 A | 5/2019 | |
| WO | WO 200042669 A1 | 7/2000 | |

OTHER PUBLICATIONS

Machine translation of JP11102711 (Year: 1997).*

* cited by examiner

*Primary Examiner* — Barbara L Gilliam
(74) *Attorney, Agent, or Firm* — Finnegan, Henderson, Farabow, Garrett and Dunner LLP

(57) ABSTRACT

The electrical collector body of the secondary battery includes a resin layer, and metal foils that cover both surfaces of the resin layer. On the metal foils, multiple holes are formed.

7 Claims, 2 Drawing Sheets

ELECTRICAL COLLECTOR BODY OF SECONDARY BATTERY AND SECONDARY BATTERY

The present application claims the priority based on Japanese Patent Application No. 2021-072121 filed on Apr. 21, 2021, the entire contents of which are incorporated in the present specification by reference.

BACKGROUND OF THE INVENTION

1. Field of the Invention

The present disclosure relates to an electrical collector body of a secondary battery and the secondary battery.

2. Description of the Related Art

A secondary battery has been conventionally known that includes an electrode sheet in which an active substance layer for storing ion is formed on an electrical collector body. For example, Japanese Patent Application Publication No. 2007-26913 discloses a lithium ion battery including a laminate metal foil which includes two sheets of roughen metal foils, in which the roughen surfaces are faced to each other. The laminate metal foils include a void between the two sheets of metal foils or a resin sandwiched by the two sheets. On the metal foil, an active substance layer for storing lithium ion is formed. Japanese Patent Application Publication No. 2007-26913 describes that the void or resin between the metal foils mitigates the expansion of the active substance layer, and thus that it is possible to suppress the active substance from being separated from the electrical collector body accompanied with charging/discharging. It describes that a lithium ion battery superior to the cycle characteristic can be obtained.

In addition, Japanese Patent Application Publication No. 2008-311171 discloses a lithium ion secondary battery that includes an electrode in which an active substance composite material layer is formed on an electrical collector body on which penetration holes are formed. The portions around these penetration holes are protrusions protruding more than the other portions of the electrical collector body. Japanese Patent Application Publication No. 2008-311171 describes that the protrusions around the holes can improve the hold ability of the active substance composite material layer formed on the electrical collector body surface and can inhibit the active substance composite material layer from being separated from the electrical collector body.

SUMMARY OF THE INVENTION

Here, an electrical collector body of a secondary battery is proposed in which the active substance layer is hardly separated and which makes the secondary battery be easily shutdown at the time of inside short circuit. In addition, a secondary battery including such an electrical collector body is proposed.

The electrical collector body of the secondary battery proposed here includes a resin layer, and metal foils that cover both surfaces of the resin layer. Multiple holes are formed on the metal foils. According to the electrical collector body of the secondary battery, it is possible to make the active substance layer be hardly separated from the electrical collector body. In addition, according to the electrical collector body of the secondary battery, the shutdown is easily caused on the secondary battery at the time of inside short circuit.

In the above-described electrical collector body, the metal foils might include protrusions that are respectively formed around at least a part of the multiple holes and that protrude toward a side of the resin layer. A protruding heights of the protrusions might be equal to or more than 0.01 μm and not more than 3 μm. According to the electrical collector body of the secondary battery, it is possible to improve the cycle characteristic of the secondary battery and the separation strength of the electrical collector body and active substance layer.

In the above-described electrical collector body, diameters of the holes might be equal to or more than 0.001 μm and not more than 100 μm. According to the electrical collector body of the secondary battery, it is possible to improve the cycle characteristic of the secondary battery and the separation strength of the electrical collector body and active substance layer. In the above-described electrical collector body, an opening ratio of the multiple holes on the metal foils might be equal to or more than 10% and not more than 80%. According to the electrical collector body of the secondary battery, it is possible to further improve the cycle characteristic of the secondary battery and the separation strength of the electrical collector body and active substance layer.

In the above-described electrical collector body, a melting point of the resin layer might be equal to or less than 255° C. According to the electrical collector body of the secondary battery, the shutdown is further easily caused on the secondary battery at the time of inside short circuit.

The secondary battery can include at least one among a positive electrode sheet in which a positive electrode active substance layer is formed on any of the electrical collector bodies described above, and a negative electrode sheet in which a negative electrode active substance layer is formed on any of the electrical collector bodies described above. According to the secondary battery, the secondary battery can have the characteristic improved by the electrical collector body.

DESCRIPTION OF THE PREFERRED EMBODIMENTS

Below, one embodiment of the secondary battery is explained. It is not intended that the embodiment explained herein particularly limits the present disclosure. Each figure is a schematic view and does not always truly reflect the actually implemented product. Below, the members/parts providing the same effect are given the same reference signs, and the overlapped explanations are appropriately omitted or simplified.

[Configuration of Secondary Battery]

Figure 1:
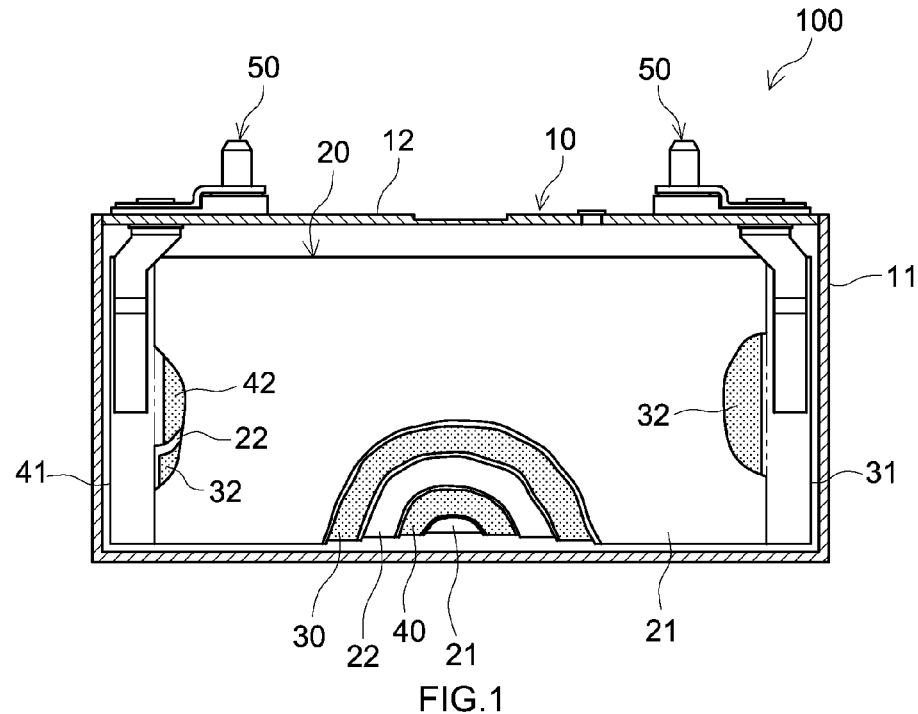
FIG. 1 is a cross sectional view of a secondary battery.

FIG. 1 is across sectional view of a secondary battery 100. As shown in FIG. 1, the secondary battery 100 includes a battery case 10, an electrode body 20, and an electrode terminal 50. The battery case 10 accommodates the electrode body 20 and an electrolyte. As shown in FIG. 1, the battery case 10 includes a case main body 11 and a cover 12.

The case main body 11 is a container having a flat square shape of an approximately rectangular parallelepiped.

The electrode body 20 is formed in an approximately rectangular parallelepiped shape in which a sheet-shaped negative electrode sheet 30 and a sheet-shaped positive electrode sheet 40 are overlaid via separator sheets 21 and 22. The electrode body 20 is accommodated in the case main body 11. The first separator sheet 21, the positive electrode sheet 40, the second separator sheet 22, and the negative electrode sheet 30 are overlaid in this order, wound therein, and accommodated in the case main body 11. Although the electrode body 20 in the present embodiment is a wound electrode body in which the positive electrode sheet 40, the negative electrode sheet 30, and the separator sheets 21 and 22 are wound, the electrode body 20 might be a laminated electrode body in which the positive electrode sheet, the negative electrode sheet, and the separator sheets are laminated.

The negative electrode sheet 30 is a sheet in which a negative electrode active substance layer 32 including a negative electrode active substance is formed on the both surfaces of the electrical collector body 31 that is formed in a foil shape having a predetermined width and thickness. The negative electrode active substance is a material that, at the time of charging, stores lithium ion and, at the time of discharging, discharges the lithium ion stored at the time of charging, as if natural graphite, for example, with respect to the lithium ion secondary battery. As for the negative electrode active substance, various materials other than the natural graphite are also proposed generally. The negative electrode active substance is not particularly limited. The configuration of the electrical collector body 31 of the negative electrode is described later.

The positive electrode sheet 40 is a sheet in which a positive electrode active substance layer 42 including a positive electrode active substance is formed on the both surfaces of the electrical collector body 41 that is formed in the foil shape having the predetermined width and thickness. The positive electrode active substance is a material that, at the time of charging, discharges lithium ion and, at the time of discharging, absorbs the lithium ion, as if lithium transition metal composite material, for example, with respect to the lithium ion secondary battery. As for the positive electrode active substance, various materials other than the lithium transition metal composite material are also proposed generally, and the positive electrode active substance is not particularly limited. The configuration of the electrical collector body 41 of the positive electrode is described later. The negative electrode sheet 30 and the positive electrode sheet 40 are respectively connected to the electrode terminals 50 provided on the outside of the battery case 10.

[Configuration of Electrical Collector Body]

Figure 2:
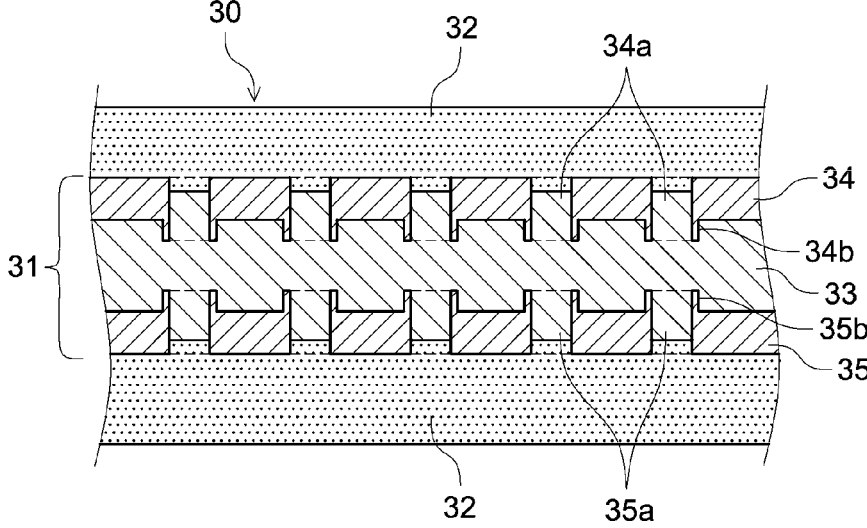
FIG. 2 is a schematical cross sectional view of a negative electrode sheet.

Below, the configuration of the electrical collector body 31 of the negative electrode will be explained. FIG. 2 is a schematical cross sectional view of the negative electrode sheet 30. As shown in FIG. 2, the electrical collector body 31 of the negative electrode includes a resin layer 33 and metal foils 34, 35 that cover both surfaces of the resin layer 33. On the metal foils 34 and 35, multiple holes 34a, 35a are formed respectively. The metal foils 34 and 35 are, for example, copper foils. However, the materials of the metal foils 34 and 35 are not particularly limited, if they can be used for the electrical collector foils of the negative electrode. The thicknesses of the metal foils 34 and 35 might be, preferably, equal to or more than 2 μm and not more than 10 μm. The multiple holes 34a of the metal foil 34 penetrate the metal foil 34 in the thickness direction. The diameters of the holes 34a might be, preferably, equal to or more than 0.001 μm and not more than 100 μm. The holes 34a might be formed by the punching process, if being relatively large. The holes 34a might be formed by the holing process with laser, the etching with chemical solution, or the like, if being relatively small.

The multiple holes 34a herein are arranged dispersedly and uniformly on the metal foil 34. However, the multiple holes 34a might be formed, for example, only at a portion of the metal foil 34 where the negative electrode active substance layer 32 is formed. At least at the portion of the metal foil 34 where the multiple holes 34a are formed, it is preferable that the multiple holes 34a are arranged dispersedly and uniformly. At the portion of the metal foil 34 where the multiple holes 34a are formed, the opening ratio of the multiple holes 34a might be equal to or more than 10% and not more than 80%. The opening ratio is a rate of the holes 34a occupying the surface of the metal foil 34, at the portion of the metal foil 34 where the multiple holes 34a are formed.

The metal foil 34 includes protrusions 34b that are respectively formed around the multiple holes 34a and protrude toward the side of the resin layer 33. However, the protrusions 34b might be formed at least around a part of the multiple holes 34a, and might not be formed around all of the holes 34a. The protrusions 34b might be a punched burr that are formed when the holes 34a are processed. The protruding heights of the protrusions 34b might be equal to or more than 0.01 μm and not more than 3 μm. The protrusions 34b are protrudingly formed into the resin layer 33.

The metal foil 35 is configured similarly to the metal foil 34. The protrusions 35b of the metal foil 35 also protrude toward the resin layer 33. However, the diameters and opening ratio of the holes 35a might not be the same as the diameters and opening ratio of the holes 34a of the metal foil 34. The protruding heights of the protrusions 35b might not be the same as the protruding heights of the protrusions 34b of the metal foil 34.

The resin layer 33 is sandwiched by two metal foils 34 and 35. The resin layer 33 herein is configured with polyethylene (PE). However, the resin layer 33 is not limited if having a low melting point to a certain extent. The melting point of the resin layer 33 might be, preferably, equal to or less than 255° C. The melting point of PE is approximately from 95° C. to 135° C., although being different on the basis of the molecular weight, or the like. The thickness of the resin layer 33 might be, for example, equal to or more than 10 μm and not more than 30 μm.

The electrical collector body 31 is produced, for example, by sandwiching the resin layer 33 between the metal foils 34 and 35 on which the holes 34a and 35a are respectively formed, and by performing the pressurizing compression (hot press). On the outer surfaces of the metal foils 34 and 35 (backside surfaces with respect to the surfaces coming into contact with the resin layer 33), the negative electrode active substance layers 32 are formed.

The electrical collector body 41 of the positive electrode sheet 40 might be configured similarly to the electrical collector body 31 of the negative electrode sheet 30, except for the material of the metal foils. The material of the metal foils of the positive electrode is, for example, aluminum. However, the secondary battery 100 might include at least one among the positive electrode sheet 40 in which the positive electrode active substance layer 42 is formed on the electrical collector body 41 and the negative electrode sheet 30 in which the negative electrode active substance layer 32 is formed on the electrical collector body 31. The positive electrode sheet 40 or negative electrode sheet 30 might be one in which the active substance layer is formed on the metal foil, similarly to the typical conventional positive electrode sheet or negative electrode sheet.

[Results of Evaluation Tests of Electrical Collector Foil]

Table 1 and Table 2 are tables showing results of the evaluation tests of the electrical collector body.

6 laser process. The holes whose diameters were equal to or less than 5 μm were formed by the etching with a chemical solution. The protrusions were formed by the electromagnetic induction heating method to rapidly heat the metal foils and to make the metal foils partially being hung down. The protruding heights of the protrusions were controlled with the heating time. The melting point of PE used here is 120° C. The hot press was performed under a condition in which

TABLE 1

| | Metal Foil | Material of Resin Layer | Presence or Absence of Holes of Metal Matarial | Height of Protrusions (μm) | Daimeter of Holes (μm) | Opening Ratio of Holes (%) | Capacity Holding Rate (%) | Safe Property Test | Standadarized Separation Strength |
|---|---|---|---|---|---|---|---|---|---|
| SAMPLE 1 | Cu | ABSENCE | ABSENCE | 0 | 0 | 0 | 30.12 | NG | 1 |
| SAMPLE 2 | Cu | ABSENCE | PRESENCE | 0 | 20 | 30 | 31.53 | NG | 1.02 |
| SAMPLE 3 | Cu | PE | PRESENCE | 0.005 | 20 | 30 | 44.65 | OK | 1.42 |
| SAMPLE 4 | Cu | PE | PRESENCE | 4 | 20 | 30 | 44.35 | OK | 1.54 |
| SAMPLE 5 | Cu | PE | PRESENCE | 1 | 0.0005 | 30 | 43.21 | OK | 1.49 |
| SAMPLE 6 | Cu | PE | PRESENCE | 1 | 110 | 30 | 42.19 | OK | 1.62 |
| SAMPLE 7 | Cu | PE | PRESENCE | 1 | 0.001 | 5 | 40.23 | OK | 1.39 |
| SAMPLE 8 | Cu | PE | PRESENCE | 1 | 100 | 5 | 40.19 | OK | 1.37 |
| SAMPLE 9 | Cu | PE | PRESENCE | 1 | 0.001 | 90 | 41.12 | OK | 1.33 |
| SAMPLE 10 | Cm | PE | PRESENCE | 1 | 100 | 90 | 41.09 | OK | 1.36 |
| SAMPLE 11 | Cu | PE | PRESENCE | 0 | 20 | 30 | 45.32 | OK | 1.45 |
| SAMPLE 12 | Cu | PE | PRESENCE | 1 | 20 | 30 | 55.43 | OK | 2.08 |
| SAMPLE 13 | Cm | PE | PRESENCE | 0.01 | 20 | 30 | 54.38 | OK | 2.02 |
| SAMPLE 14 | Cu | PE | PRESENCE | 0.1 | 20 | 30 | 55.48 | OK | 2.11 |
| SAMPLE 15 | Cm | PE | PRESENCE | 3 | 20 | 30 | 53.99 | OK | 2.06 |
| SAMPLE 16 | Cu | PE | PRESENCE | 1 | 0.001 | 30 | 53.21 | OK | 2.03 |
| SAMPLE 17 | Cu | PE | PRESENCE | 1 | 10 | 30 | 53.99 | OK | 1.99 |
| SAMPLE 18 | Cu | PE | PRESENCE | 1 | 50 | 30 | 55.53 | OK | 2.09 |
| SAMPLE 19 | Cu | PE | PRESENCE | 1 | 100 | 30 | 54.49 | OK | 2.15 |
| SAMPLE 20 | Cm | PE | PRESENCE | 1 | 100 | 10 | 55.98 | OK | 2.11 |
| SAMPLE 21 | Cu | PE | PRESENCE | 1 | 0.001 | 25 | 56.25 | OK | 2.14 |
| SAMPLE 22 | Cu | PE | PRESENCE | 1 | 100 | 40 | 54.39 | OK | 2.12 |
| SAMPLE 23 | Cu | PE | PRESENCE | 1 | 0.001 | 80 | 55.84 | OK | 2.22 |

35

TABLE 2

| | Metal Foil | Material of Resin Layer | Presence or Absence of Holes of Metal Matarial | Height of Protrusions (μm) | Daimeter of Holes (μm) | Opening Ratio of Holes (%) | Capacity Holding Rate (%) | Safe Property Test | Standadarized Separation Strength |
|---|---|---|---|---|---|---|---|---|---|
| SAMPLE 24 | Cu | Polyamide (m.p 265° C.) | Presence | 1 | 20 | 30 | 54.13 | NG | 2.01 |
| SAMPLE 25 | Cu | PET (m.p 200° C.) | Presence | 1 | 20 | 30 | 55.22 | OK | 2.65 |
| SAMPLE 26 | Cu | PE (m.p. 120° C.) | Presence | 1 | 20 | 30 | 55.43 | OK | 2.08 |

Here, 25 samples were prepared and then the evaluation test was performed. As shown in Table 1 and Table 2, the samples 1 to 25 are produced samples for evaluation in which the presence or absence and material of the resin layer, the presence or absence of the holes of the metal foils, the heights of the protrusions ("0" of the height of the protrusion indicates that no protrusion is provided), the diameters of the holes, and the opening ratio of the holes ("0" of the diameter of the hole and "0" of the opening ratio of the holes indicate that no hole is provided) are changed.

Regarding the samples 1 to 25 made for the evaluation test, the thickness of the metal foils (copper foils) was set to be 5 μm. In addition, the thickness of the resin layer was set to be 20 μm. Among the samples 1 to 25, the holes whose diameters were larger than 100 μm were formed by the punching process. The holes whose diameters were larger than 5 μm and not more than 100 μm were formed by the the temperature was 100° C., the pressure was 5 MPa, and the time period of the pressing was 30 seconds.

The capacity holding rate was calculated by comparing capacities before and after performing 200 cycles of charge/discharge with the voltage 3.3 V to 4.2 V under the environment of 60° C. The capacity holding rate is a value in which the capacity after the 200 cycles is divided by the initial capacity. For each of the initial capacity and the 200 cycles later capacity, a secondary battery at the full charge state was subjected to the electric discharge under a predetermined condition and then the resultant capacity was used. In order to make the secondary battery be at the full charge state, the constant current charge was performed with ⅓ C current value till 4.2 V and then the constant voltage charge was performed till the current value reached ¹⁄₅₀ C. The electric discharge, after the secondary battery was at the full charge state, was performed with ⅓ C current value till the voltage reached 3 V. The temperature at the capacity measurement time was set to be 25° C. For calculating the capacity holding rate, the capacity at that time was used.

In the safety evaluation, a secondary battery was subjected to the constant current charge with the current value set as $\frac{1}{3}$ C and with the charge upper limit voltage set as 4.2 V, and then subjected to the constant voltage charge till the current value reaches $\frac{1}{10}$ C so as to be at the full charge state. Then, the central part of the resultant secondary battery was penetrated at a speed of 10 mm/s by an iron nail whose diameter was 3 mm. The outer surface temperature of the battery at that time was measured by a thermocouple, and then it was treated as "OK" when the highest temperature was less than 200° C. and treated as "NG" when the highest temperature was equal to or more than 200° C. The test temperature was set to be 25° C. In the material evaluation for the resin layer shown in Table 2, it was treated as "OK" when the highest temperature was less than 150° C. and treated as "NG" when the highest temperature was equal to or more than 150° C. after the temperature measurement the same as one described above was performed. The safety evaluation is a test in which a nail is driven to cause an inside short circuit on the secondary battery in order to evaluate the meltdown property of the electrical collector body after the inside short circuit.

In the separation strength measurement, an adhesive tape for general having the width of 24 mm and the length of 300 mm was attached to the surface of the active substance layer and the sample was fixed on a test plate. Then the force when the active substance layer can have been separated off by the angle of 90° with respect to the test plate was measured as the separation strength. The measured separation strength was subjected to standardization while the separation strength of the sample 1 was used as the reference.

[Effects of Resin Layer and Holes of Metal Foils]

Regarding Table 1, comparison is performed between the samples 1 and 2 and the sample 11. As shown in Table 1, for the samples 1 and 2 on which no resin layer was provided, the safe property test results are "NG". For the sample 11 on which the resin layer was provided, the safe property test result is "OK". This represents that, in the electrical collector body on which the resin layer is provided, the fusion cutting occurred on the metal foils before the outer surface temperature of the secondary battery reached 200° C. when the inside short circuit was caused. If the temperature of the metal foils increases due to the inside short circuit, the heat melts the resin layer of the electrical collector body. Breakage is easily caused on a metal foil on which multiple holes are provided. If the resin layer melts, the support of the metal foils is lost and a partial tear of the metal foils occurs. As a result, the passage of current is decreased and local superheating progress in the sample 11. When the fusion cuttings on this local superheated portion are caused like chain, the electrical collector body is broken at a lower temperature than the melting point of the metal foil (herein, the melting point of copper being about 1084° C.). Thus, with the electrical collector body according to the sample 11, the shutdown is easily caused on the secondary battery at the time of inside short circuit.

As shown in Table 1, the separation strength of the sample 11 is larger than the separation strengths of the samples 1 and 2. This reason is thought that, in the sample 11, the active substance layer enters into the multiple holes of the metal foils and is caught by the holes.

Furthermore, as shown in Table 1, the capacity holding rate of the sample 11 is higher than the capacity holding rates of the samples 1 and 2. Thus, it can be thought that the sample 11 has a favorable cycle characteristic more than the samples 1 and 2. This reason is thought that the resin layer exists between two metal foils and thus the effect of expansion/contraction of the active substance layers due to the charging/discharging is mitigated so as to make the active substance layers be hardly separated from the electrical collector body.

[Effect of Protrusion]

Regarding Table 1, comparison is performed between the samples 1 to 4 and the samples 13 to 15. In the case where the heights of the protrusions are low (samples 1 to 3, including the case where no protrusion exists) and the case where the heights of the protrusions are high (sample 4), the capacity holding rate is lower and the standardized separation strength is smaller, compared with the case where the heights of the protrusions are suitable (samples 13 to 15). Providing protrusions whose heights are equal to or more than a certain extent can improve the cycle characteristic and increase the separation strength. However, if the heights of the protrusions are higher than the suitable height, the cycle characteristic becomes worse again and the separation strength is decreased. As shown in Table 1, at least in the case where the protruding heights of the protrusions are equal to or more than 0.01 μm and not more than 3 μm, the cycle characteristic is improved and the separation strength is increased, more than the other ranges. The reason why the cycle characteristic is improved with the appropriate protruding heights of the protrusions is estimated that the bind force of the resin layer and metal foils becomes an appropriate bind force, and the metal foils and the resin layer can move at the time of charging/discharging in addition they can be hardly separated. The reason why the cycle characteristic becomes worse with the too high protruding heights of the protrusions is estimated that the bind force of the resin layer and metal foils is too strong, and the metal foils and the resin layer can hardly move at the time of charging/discharging, and thus the electrical collector body easily takes damages. The reason why the separation strength is improved with the appropriate protruding heights of the protrusions is estimated that the metal foils and the resin layer appropriately move at the time of separation test so as to absorb a part of the separation force. The reason why the separation strength becomes worse with the too high protruding heights of the protrusions is estimated, on the contrary, that the metal foils and the resin layer can hardly move at the time of separation test. The reason why the effect cannot be observed with the small protruding heights of the protrusions is estimated that the protruding heights are too low so as to not implement the function as the protrusions. In addition, it is expected that, when the protruding heights of the protrusions are appropriate, the result of the safe property test is also improved. The inventors of the present application have confirmed that, when the protruding heights of the protrusions are higher than 3 μm, the resin layer and the metal foils tend to easily move together and the metal foils hardly take the breakage.

[Effect of Hole Diameter]

Regarding Table 1, comparison is performed between the samples 5 and 6 and the samples 2 and 16 to 19. In the case where the diameters of the holes of the metal foils are small (sample 5) and in the case where they are large (sample 6), the capacity holding rate is lower and the standardized separation strength is smaller, compared with the case where the diameters of the holes are suitable (samples 2 and 16 to 19). Enlarging the diameters of the holes more than a certain extent can improve the cycle characteristic and increase the separation strength. However, if the sizes of the holes are larger than the suitable size, the cycle characteristic becomes worse again and the separation strength is decreased. As shown in Table 1, at least in the case where the diameters of the holes of the metal foils are equal to or more than 0.001 μm and not more than 100 μm, the cycle characteristic is improved and the separation strength is increased, more than the other ranges. In the case where the diameters of the holes of the metal foils are equal to or more than 50 μm and not more than 100 μm, more favorable values are shown as the cycle characteristic and the separation strength. The reason why the cycle characteristic is improved with the appropriate sizes of the holes is estimated that the resin layer appropriately enters into the holes, and the metal foils and the resin layer can move at the time of charging/discharging in addition that they can be hardly separated. The reason why the separation strength becomes larger with the appropriate sizes of the holes is estimated that the active substance layers enter into the holes so as to be caught firmly by the holes.

[Effect of Opening Ratio]

Regarding Table 1, comparison is performed between the samples 7 to 10 and the samples 8 and 20 to 23. In the case where the opening ratio of the holes on the metal foils is small (samples 7 and 8) and in the case where it is large (samples 9 and 10), the capacity holding rate is lower and the standardized separation strength is smaller, compared with the case where the opening ratio of the holes is suitable (samples 8 and 20 to 23). Enlarging the opening ratio of the holes more than a certain extent can improve the cycle characteristic and increase the separation strength. However, if the opening ratio is higher than the suitable opening ratio, the cycle characteristic becomes worse again and the separation strength is decreased. As shown in Table 1, at least in the case where the opening ratio of the holes on the metal foils is equal to or more than 10% and not more than 80%, the cycle characteristic is improved and the separation strength is increased, more than the other ranges. The reason why the cycle characteristic is improved with the appropriate opening ratio is estimated that the resin layers appropriately enter into the holes, and the metal foils and the resin layers can move at the time of charging/discharging in addition that they can be hardly separated. The reason why the separation strength becomes larger with the appropriate opening ratio is thought that a large amount of active substance enters the holes so as to keep the strength of the metal foils being a suitable strength. In addition, it has been confirmed that the result of the safe property test is also improved when the opening ratio of the holes is equal to or more than 10% and not more than 80%. The inventors of the present application have confirmed that, when the opening ratio of the holes is equal to or more than 10% and not more than 80%, the secondary battery can pass the more severe safe property test shown in Table 2 (decision threshold 150° C.).

[Effect of Resin Layer]

Regarding Table 2, comparison is performed between the sample 24 and the samples 2 and 25. As shown in Table 2, in the case where the melting point of the resin layer is high (sample 24), the temperature of the battery at the time of the inside short circuit is higher, compared with the case where the melting point of the resin layer is suitable (samples 2 and 25). As shown in Table 1, at least in the case where the melting point of the resin layer is equal to or less than 255° C., the secondary battery can pass the more severe safe property test in which the decision threshold is low (herein, the decision threshold is 150° C.). Since the secondary battery cannot pass this test in the case where the melting point of the resin layer is 265° C., it would be understood that the safe property for the more severe safe property test level can be secured if a material whose melting point is equal to or less than 255° C. is used for the resin layer. As described above, the shutdown is easily caused on the secondary battery at the time of inside short circuit if the material whose melting point is equal to or less than 255° C. is used for the resin layer.

Above, one embodiment for the electrical collector body of secondary battery and the secondary battery proposed here is explained. However, the above-described embodiment is merely an example, and thus the contents proposed herein could be implemented with other embodiments. The above-described embodiment does not limit the present disclosure, unless mentioned particularly.

What is claimed is:

1. An electrical collector body of a secondary battery, comprising:
    a resin layer; and
    metal foils that cover both surfaces of the resin layer, wherein
    multiple holes penetrate all the way through each of the metal foils,
    the metal foils comprise protrusions that are formed around at least some of the multiple holes and that protrude toward the resin layer,
    the protrusions protrude into the resin layer, and
    the resin layer enters into the multiple holes.

2. The electrical collector body of the secondary battery according to claim 1,
    wherein a part of the resin layer enters into the multiple holes that penetrate all the way through each of the metal foils toward a respective outer surface of each of the metal foils for a distance that is greater than a protruding height of the protrusions and blocks the multiple holes.

3. The electrical collector body of the secondary battery according to claim 1,
    wherein the protruding height of the protrusions is equal to or more than 0.01 μm and less than or equal to 3 μm.

4. The electrical collector body of the secondary battery according to claim 1,
    wherein diameters of each of the multiple holes are equal to or more than 0.001 μm and less than or equal to 100 μm.

5. The electrical collector body of the secondary battery according to claim 1,
    wherein an opening ratio of the multiple holes at a portion of the metal foils where the multiple holes are formed is equal to or more than 10% and less than or equal to 80%.

6. The electrical collector body of the secondary battery according to claim 1,
    wherein a melting point of the resin layer is equal to or less than 255° C.

7. A secondary battery, comprising:
    at least one among a positive electrode sheet in which a positive electrode active substance layer is formed on the electrical collector body according to claim 1 and a negative electrode sheet in which a negative electrode active substance layer is formed on the electrical collector body according to claim 1.

* * * * *